Figure 1:
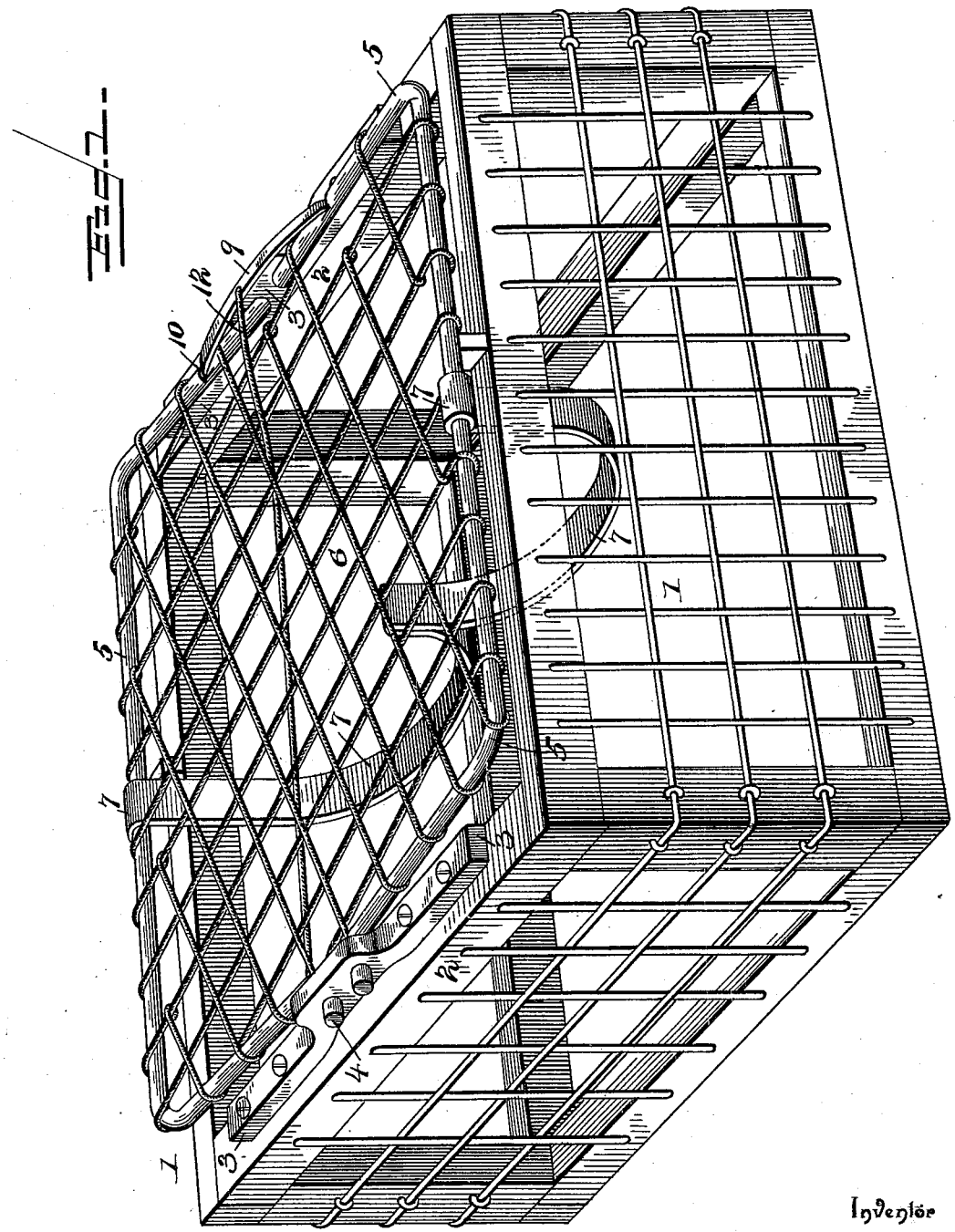

(No Model.)  2 Sheets—Sheet 1.

W. S. IRWIN.
COMBINED CHICKEN COOP AND HAWK TRAP.

No. 521,266.  Patented June 12, 1894.

Witnesses
E. H. Stewart
N. H. Riley

Inventor
William S. Irwin,
By his Attorneys.
C. A. Snow & Co.

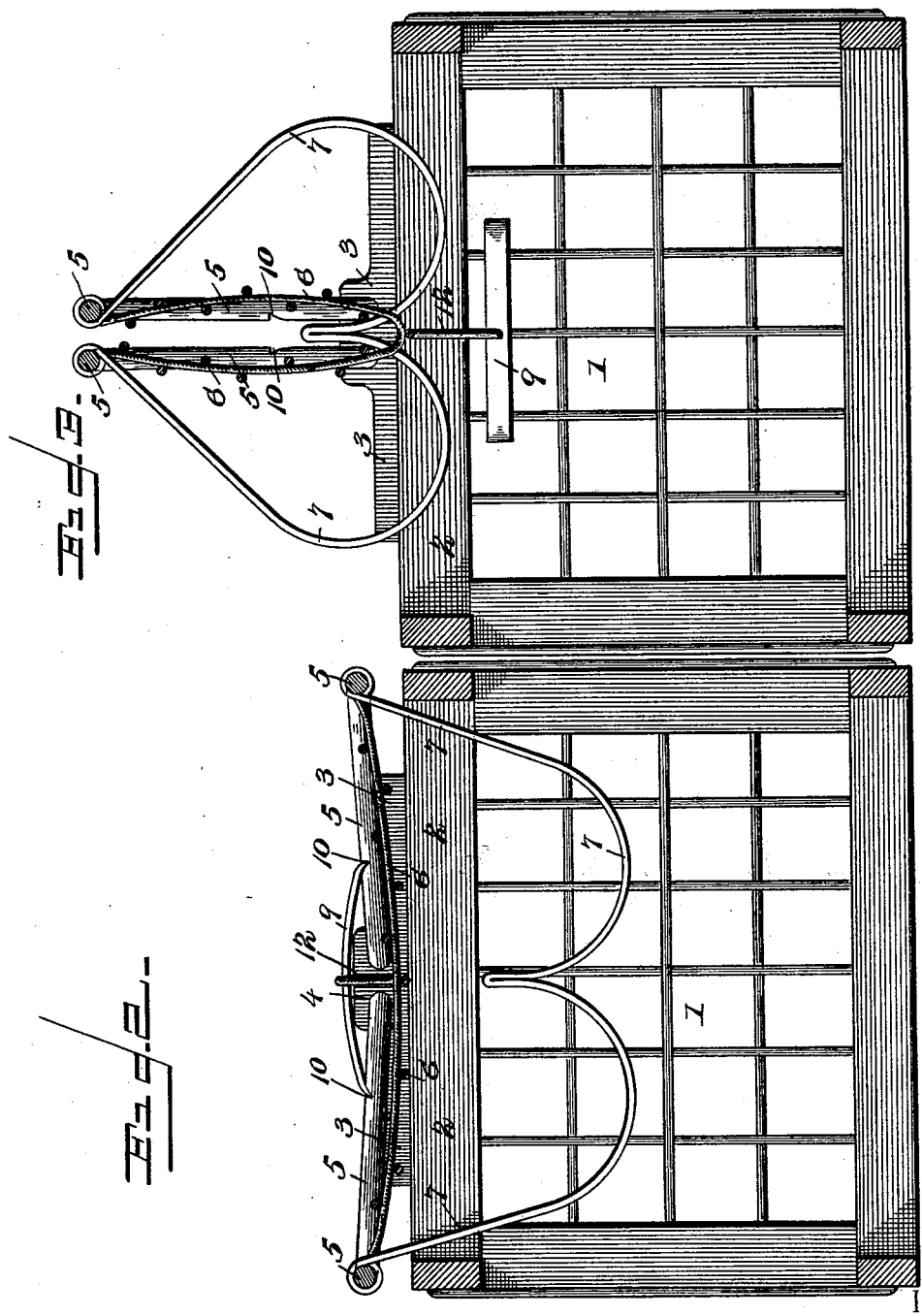

UNITED STATES PATENT OFFICE.

WILLIAM SNEED IRWIN, OF KNOXVILLE, TENNESSEE.

COMBINED CHICKEN-COOP AND HAWK-TRAP.

SPECIFICATION forming part of Letters Patent No. 521,266, dated June 12, 1894.

Application filed September 16, 1893. Serial No. 485,713. (No model.)

*To all whom it may concern:*

Be it known that I, WILLIAM SNEED IRWIN, a citizen of the United States, residing at Knoxville, in the county of Knox and State of Tennessee, have invented a new and useful Combined Chicken-Coop and Hawk-Trap, of which the following is a specification.

The invention relates to improvements in chicken coops.

The object of the present invention is to provide a hawk and owl proof chicken coop, which will be simple and inexpensive in construction, and which will be capable of trapping a hawk or other bird of prey, and of preventing such from injuring the chickens contained in the coop.

A further object of the invention is to provide such a device in which the trap will not interfere with the use of the device as a coop for chickens.

The invention consists in the construction and novel combination and arrangement of parts, hereinafter fully described, illustrated in the accompanying drawings and pointed out in the claims hereto appended.

In the drawings—Figure 1 is a perspective view of a chicken coop constructed in accordance with this invention, the trap being set. Fig. 2 is a transverse sectional view of the same. Fig. 3 is a similar view, the trap being sprung.

Like numerals of reference indicate corresponding parts in all the figures of the drawings.

1 designates a chicken coop, comprising a frame of any suitable construction and provided with open wirework sides and ends and having an open top. The frame of the coop is provided on its top end bars 2 with bearings 3, in which are arranged outward extending journals 4 of rectangular frames 5 having secured to them a netting 6 forming two wings. The rectangular frames or wings are adapted, as illustrated in Fig. 1 of the accompanying drawings, to be swung down to a horizontal position to spread the netting and to form the top of the coop; and they are adapted to form a trap and when the trap is sprung the netting forms a bag for holding the victim, which may be a hawk, owl or the like. The sides or frames 5 are actuated when the trap is sprung by an approximately inverted heart-shaped spring 7 provided at its ends, which are arranged at the top, with eyes to receive the hinged sides or frames.

The trap is set by a trigger 9, which when in position rests upon the ends of the hinged frames adjacent to one end of the coop and engages shouldered notches 10 of the adjacent ends of the hinged frames, and has its ends slightly beveled and bent downward to facilitate such engagement. The trigger is connected with the flexible netting by a cord 12 or other suitable means, and should a hawk or other bird disturb any portion of the netting, the trigger will be dislodged and the trap will be sprung imprisoning such bird in a bag formed by the flexible netting.

The coop will be constructed of such dimensions that the depending spring will not interfere with the free use of the coop; and there is no liability of the contents of the coop being injured by a hawk, or other bird of prey.

It will be readily seen that the combined coop and trap is exceedingly simply and inexpensive in construction and positive and reliable in operation, and that the trap requires no other bait than the contents of the coop. It will also be seen that the contents of the coop are fully protected and cannot be injured by a bird of prey while springing the trap.

Changes in the form, proportion and the minor details of construction may be resorted to without departing from the principle or sacrificing any of the advantages of this invention. For instance, I do not wish to be limited to the particular construction of trap, as shown in the drawings, as I am aware that other forms of traps might be substituted in lieu thereof without changing the invention. Any construction of trap which will be attached permanently to the top of a coop of ordinary construction, said trap, when extended in its set position, inclosing the top of the coop and serving as a cover therefor, will come within the principle of my invention.

What I claim is—

1. A coop provided with two hinged wings, which form, when set, the top of the coop and which constitute a trap, substantially as described.

2. A coop having the usual inclosed sides and ends and provided with a top composed of spring-actuating hinged sections, a trigger for the same, and means for tripping the trigger, thereby constituting a trap, said trap when set serving as a cover for the coop, substantially as described.

3. A coop having a top composed of opposite hinged frames, a netting connecting the frames, a spring for actuating the hinged frame, and a trigger connected with the netting for setting the trap and holding the frames apart, substantially as described.

4. A coop comprising a frame having an open top, the opposite hinged frame mounted at the top of the coop frame and conforming to the configuration thereof and extending around the upper edges of the same when in a horizontal position, a netting attached to the hinged frames and completing the top of the coop, a spring for forcing the hinged frames upward, and a trigger for holding the hinged frames in a horizontal position connected with the netting, substantially as described.

5. A coop comprising a coop frame open at the top, the opposite hinged frame journaled at the top of the coop frame and provided with adjacent notches, a netting attached to the hinged frames, a depending inverted substantially heart-shaped spring connected to the hinged frames, and a trigger adapted to engage said notches and connected with the netting, substantially as described.

In testimony that I claim the foregoing as my own I have hereto affixed my signature in the presence of two witnesses.

WILLIAM SNEED IRWIN.

Witnesses:
J. E. O'FALLON,
JEFF. K. MOORE.